2 Sheets--Sheet 1.

S. WHIPPLE.
Lift Draw-Bridges.

No. 134,338. Patented Dec. 24, 1872.

Witnesses,
R. Dorlon
Geo V Thacker

Inventor
Squire Whipple

2 Sheets--Sheet 2.

S. WHIPPLE.

Lift Draw-Bridges.

No. 134,338. Patented Dec. 24, 1872.

Witnesses
R. Dorlon
Geo. V. Thacher

Inventor.
Squire Whipple.

UNITED STATES PATENT OFFICE.

SQUIRE WHIPPLE, OF ALBANY, NEW YORK.

IMPROVEMENT IN LIFT DRAW-BRIDGES.

Specification forming part of Letters Patent No. 134,338, dated December 24, 1872.

*To all whom it may concern:*

Figure 1:
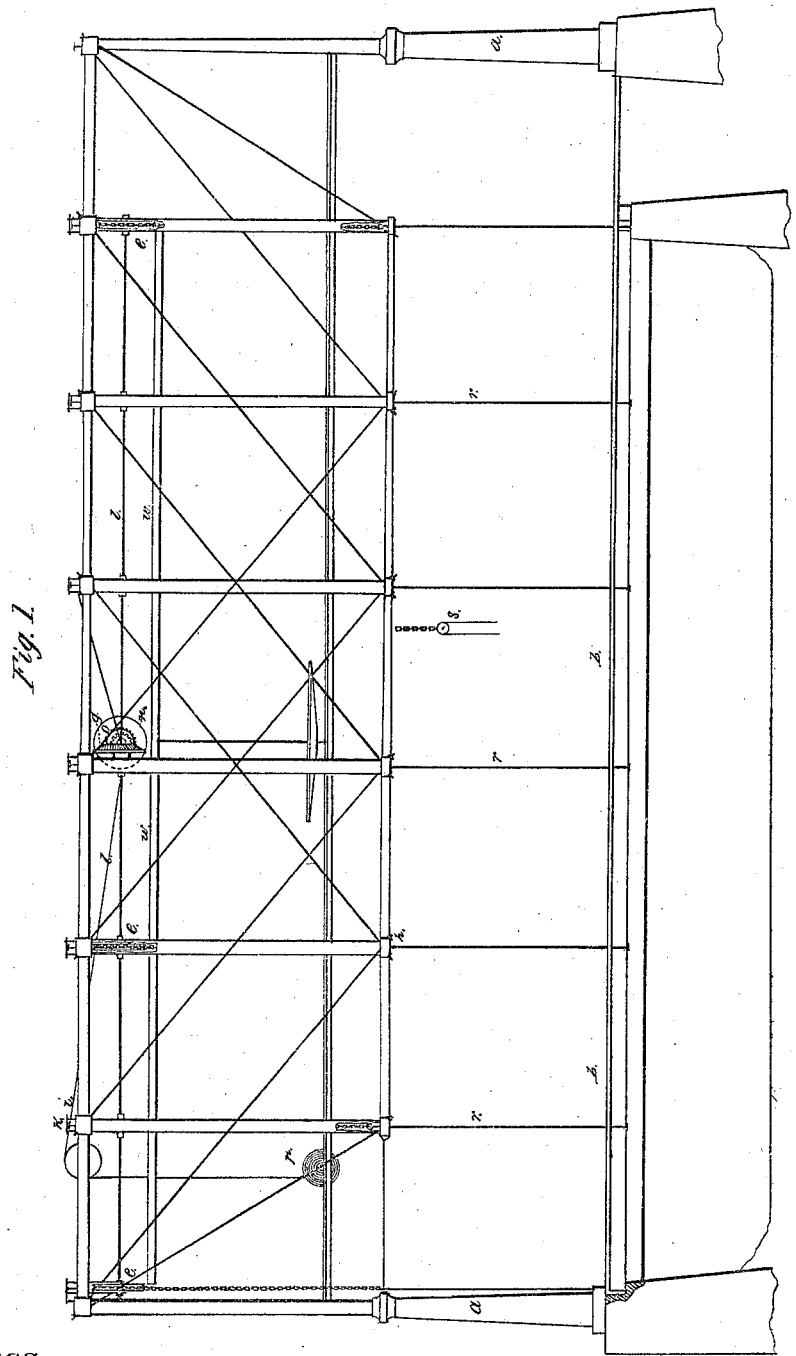
Figure 2:
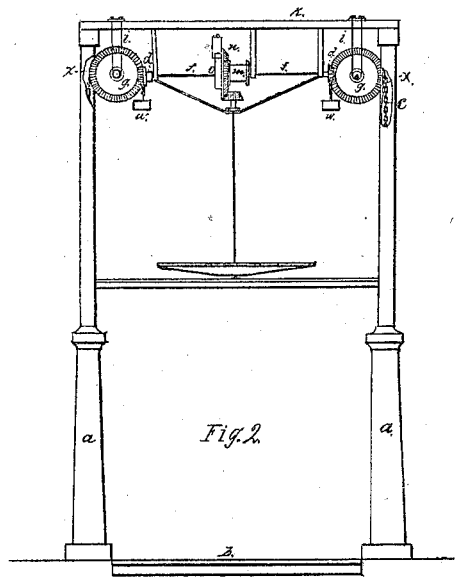

Be it known that I, SQUIRE WHIPPLE, of Albany, New York, have invented a certain Improvement in Draw-Bridges, of which the following is a specification:

In the drawing, Figure 1 is a side view, and Fig. 2 an end view with certain parts removed.

I erect a truss-bridge upon any of the usual plans, supported by corner piers, iron pillars, or wooden posts $a$, properly secured in vertical positions, and at sufficient elevation to afford the required head-room for navigation below the trusses. Instead of a stationary carriage-way, whether for railroad or common road vehicles, permanently attached to the supporting-trusses, I suspend a movable way, cradle, or platform, $b$, by means of rods $r$ and chains $c$, the chains passing over pulleys $e$, and connecting with weights $w$, to balance and counterpoise the weight of the platform.

The pulley-wheels supporting the platform and counter-weights are hung upon two line-shafts, $l$, running lengthwise, one upon each side of the bridge near the upper chords of the trusses, the pulleys being made fast on the shafts, one upon each, directly over the transverse or "needle" beams of the platform, so that all may rotate together along with the shafts upon which they are respectively hung.

Equal bevel-gear wheels $g$ are placed opposite to one another, one upon each longitudinal shaft, usually near the centers of the shafts. These gear-wheels work each into a corresponding wheel or pinion, $d$, made fast upon the end of a transverse shaft, $f$, thus coupling the two line-shafts and securing a synchronous motion of said shafts and the pulley-wheels supporting the platform and counter-weights.

The suspension-rods are connected at the lower ends with ends of transverse beams of the platform, and at the upper ends with the chains or ropes (whether of wire or other material) passing over the pulleys as aforesaid, and sustaining the counter-weights on the opposite sides of the pulleys. The platform or cradle, being thus counterbalanced, may be raised or lowered by the application, in any manner to the transverse shaft $f$, of power sufficient to overcome the friction of the journals, and the gearing of and upon the several shafts, and the resistance from the working of the ropes or chains over the pulleys. The shafts should have a journal upon one or both sides (the latter preferable) of each pulley-wheel.

The suspension-rods $r$, except those at the ends of the platform, should each slide freely through a hole or opening near the lower chord of the stationary truss, with a nut or collar at the upper end to arrest the descent of the rod in order to prevent the platform from falling too low, and to sustain it at the required elevation for the transit of loads. Said openings for the passage of the suspension-rods may be in or near the ends of transverse beams, permanently fixed above or below the lower truss-chords; or the rods may work inside of hollow truss-posts, with side openings in said posts near the upper ends for the chains and small segments of the pulley-wheels to enter, as at $x$, so as to bring the chains near the centers of the hollow posts. In the latter case the suspension-rods may pass through cast-iron connecting-blocks $h$ of the chords; or the suspension-rods may be double, with a loop at the top of each to be stopped by a round connecting-pin between the two branches of the rod. The ends of the platform dropping down upon abutments or fixed supports, the endmost suspension-rods need no stops at the upper ends.

The longitudinal line-shafts may be suspended upon hangers $i$ from cross-beams $k$, connecting the upper truss-chords; or said shafts may be supported above said cross-beams, the suspension-chains passing down through or outside of the upper chord. By placing the line-shafts above the upper chords a less depth of truss becomes sufficient to give the required rise and fall of the platform. The upper chords, as well as the movable platform, should have suitable and efficient cross tying or bracing (in the usual manner) to preserve them in line.

The platform or way may be raised and lowered by manual, steam, or animal power. In the use of manual power time may be saved in effecting the movement by the employment of a power weight or weights, $p$, that may be wound up in either direction, (as by means of the winding-drum $m$, attached to the gear-wheel $n$, working loose upon the shaft $f$, and carrying a reversible catch working by a spring into the teeth of the ratchet-wheel o made fast to the shaft,) and kept always ready to be applied in moving or assisting to move the platform up or down in the shortest admissible time. A weight that may be leisurely wound up, and requiring the labor of several minutes in the winding, may open or close the draw in a fraction of a minute, without imposing severe exertion upon the operator. The power-weight should have an excess of power beyond that required to balance the friction, to act as an accelerating force, and its action should be arrested in time for the friction to destroy the acquired momentum, and prevent a violent concussion at the end of the movement.

This improvement is especially applicable upon navigable canals through cities and villages, as it occupies much less space and requires less time in operating it than is required for the pivot or swing draw-bridge.

No claim is here made to the original invention of lift draw-bridges in general, or of any particular plan for the stationary trusses, or of any particular mode or arrangement for applying the winding power to the winding-drum m in case it be used, or the working power to the transverse shaft f in case of the power-weight being dispensed with; but I do claim as my invention, and as not before known or used—

1. In the construction of lift draw-bridges, the combination of the counterpoised vertically movable way or platform, the trusses, the suspension rods, chains, or ropes, the longitudinal shafts on each side of the bridge, and the transverse shaft or shafts and gearing, substantially as and for the purposes specified.

2. The longitudinal and transverse shafts connected by gearing to effect the simultaneous rotation of the shafts and a uniform vertical movement of all parts of the platform, substantially as specified.

3. The combination of the power-weight and winding-drum m upon the transverse shaft f, for the purpose of working the draw, substantially as set forth.

SQUIRE WHIPPLE.

In presence of—
   GEO. V. THACHER,
   R. DORLON.